United States Patent [19]

Boisclair

[11] 4,259,664

[45] Mar. 31, 1981

[54] TAXICAB ROBBERY ALERTING SYSTEM

[75] Inventor: William F. Boisclair, Warner Robins, Ga.

[73] Assignee: Tubill Enterprises, Inc., Grand Bay, Ala.

[21] Appl. No.: 52,446

[22] Filed: Jun. 26, 1979

[51] Int. Cl.[3] .......................... G08B 1/08; B60R 25/10

[52] U.S. Cl. ...................................... 340/539; 340/63; 340/574

[58] Field of Search ...................... 340/63, 64, 68, 539, 340/573, 574; 455/39, 99

[56] References Cited

U.S. PATENT DOCUMENTS

| | | | |
|---|---|---|---|
| 2,840,795 | 6/1958 | Yun Gee | 340/63 |
| 2,891,140 | 6/1959 | Huff | 340/63 |
| 2,979,706 | 4/1961 | Simon et al. . | |
| 3,864,674 | 2/1975 | Worsham et al. | 340/539 |
| 3,909,826 | 9/1975 | Schildmeier et al. | 340/539 |
| 4,020,477 | 4/1977 | Holland . | |
| 4,027,276 | 5/1977 | Shaughnessy . | |
| 4,032,848 | 6/1977 | Shaughnessy . | |
| 4,057,790 | 11/1977 | Fleming et al. . | |

*Primary Examiner*—Alvin H. Waring
*Attorney, Agent, or Firm*—Poms, Smith, Lande & Rose

[57] ABSTRACT

In the event that a taxicab driver is threatened with robbery, he depresses a silent floor switch in his taxicab which initiates two different alarm or alerting mechanisms, neither of which are visible to the robber who is normally sitting in the back seat of the taxicab. First, a special warning light appears on the roof of the cab; and second, a coded signal is sent back to the dispatcher's office to both identify the serial number of the cab in which the robbery is threatened, and also to provide a continuous coded signal which may be employed to direct police or private detectives to the location of the robbery. The equipment is compatible with existing radio equipment interconnecting the taxicab dispatcher's office and the taxicab, and at the dispatcher's office merely involves the provision of counting and display circuitry and possibly supplemental filter circuitry; and at each taxicab, the addition of a tone generator, a pulse train generator, and timing circuitry for disabling the pulse generator after a predetermined number of pulses representing the serial number of the taxicab, have been transmitted.

10 Claims, 5 Drawing Figures

Fig. 1.
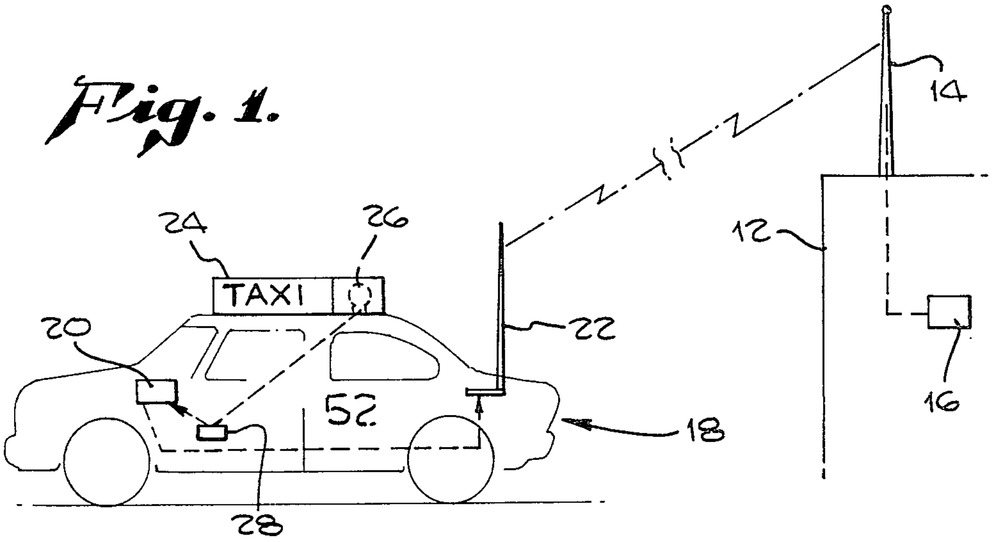
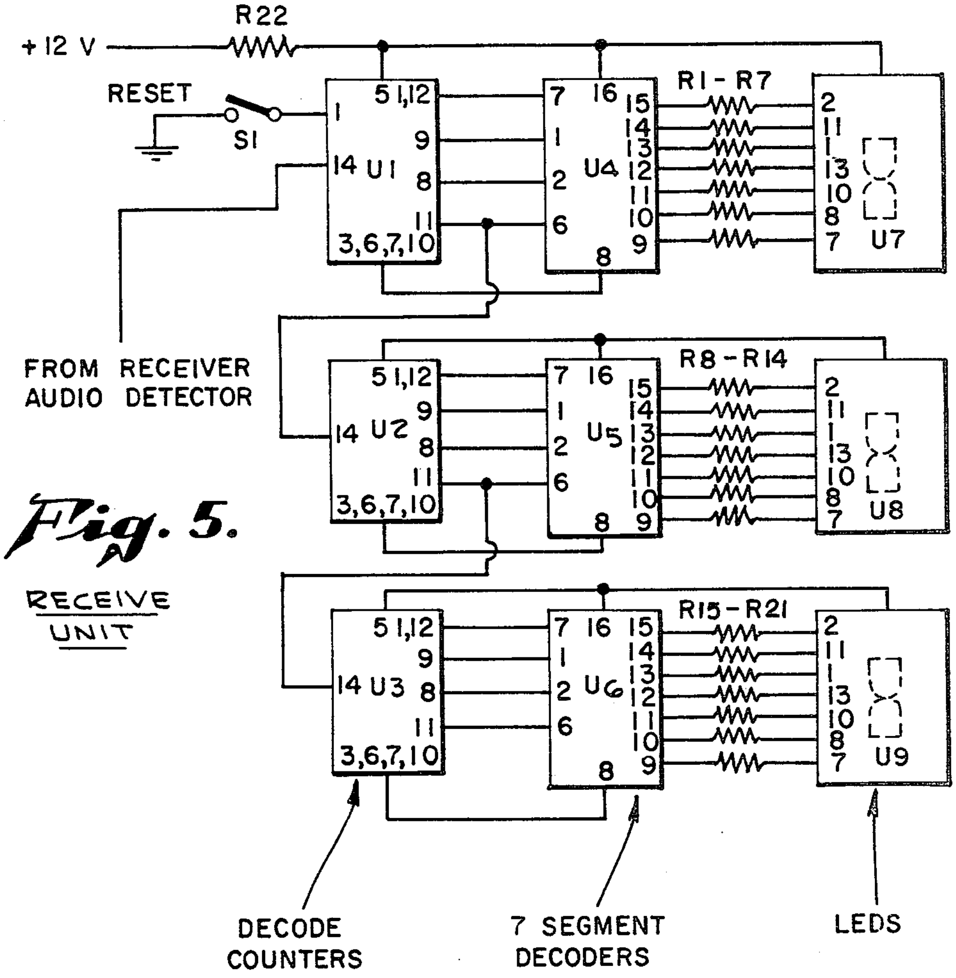
Fig. 5.
RECEIVE UNIT

TAXICAB ROBBERY ALERTING SYSTEM

BACKGROUND OF THE INVENTION

The present invention relates to the field of warning or alerting apparatus for protection against robbery.

In many areas of the country, particularly in large metropolitan cities and especially during nighttime hours, taxicabs and taxicab drivers have been subject to unusually high incidence of robberies. Further, many of these robberies have resulted in the injury and frequently the death of the taxicab driver.

Incidentally, a number of specialized warning systems have been proposed heretofore, see U.S. Pat. Nos. 2,979,706; 4,020,477; 4,027,276; 4,032,848, and 4,057,790. However, none of these systems are suitable for the protection of taxicabs and taxicab drivers.

Accordingly, a principal object of the present invention is to provide an inexpensive and practical robbery alerting system for taxicabs, and one which is compatible with existing radio equipment, and which does not alert the robber to the fact that the system has been put into operation.

SUMMARY OF THE INVENTION

The present invention involves a silent foot switch which may be selectively operated by the taxicab driver to initiate operation of an alarm when the driver is threatened by a robber. More specifically, the silent foot switch actuates both a radio transmission which informs the central dispatch office of the serial number of the cab, and also illuminates a special warning signal on the top of the cab, in a location and with a color and intensity such that it is not visible to any of the occupants of the cab.

In accordance with a subordinate feature, if desired, the system may include a special additional switch so that if the robber opens the door to determine whether the warning light is lit, the driver may selectively turn it off.

The system of the present invention is compatible with existing taxicab dispatching and responding transmitter and receiver circuitry, and includes in the taxicab a coded signal transmission circuit, and arrangements for transmitting a special signal which may be an audio tone and which represents the alerting or alarm signal; and at the dispatcher's office, the necessary equipment merely includes decoding equipment to ascertain the serial number of the cab and a display arrangement to store and display the decoded identification number.

In one illustrative form, the taxicab serial number may be transmitted as a simple pulse train, and the decoding circuitry in the dispatcher's office may constitute a simple set of decade counters and corresponding LED (Light Emitting Diode) or LCD (Liquid Crystal Display) display units.

The presently proposed system has the advantage of both alerting the central dispatch office so that the records may be checked to determine the general location of the particular cab, and subsequently, if necessary, radio direction-finding equipment may be employed to specifically locate the taxicab. Further, in the event that a police patrol car reaches or passes a taxicab in which the warning or alerting light is illuminated, the police car may promptly provide the necessary assistance.

Other objects, features and advantages of the present invention will become apparent from a consideration of the following detailed description and from the drawings.

BRIEF DESCRIPTION OF THE DRAWINGS

FIG. 1 is a schematic showing of the mode of operation of a system illustrating the principles of the invention;

FIG. 5 is a circuit diagram indicating one mode of implementation of a portion of the circuitry shown in FIG. 3.

DETAILED DESCRIPTION

Figure 2:
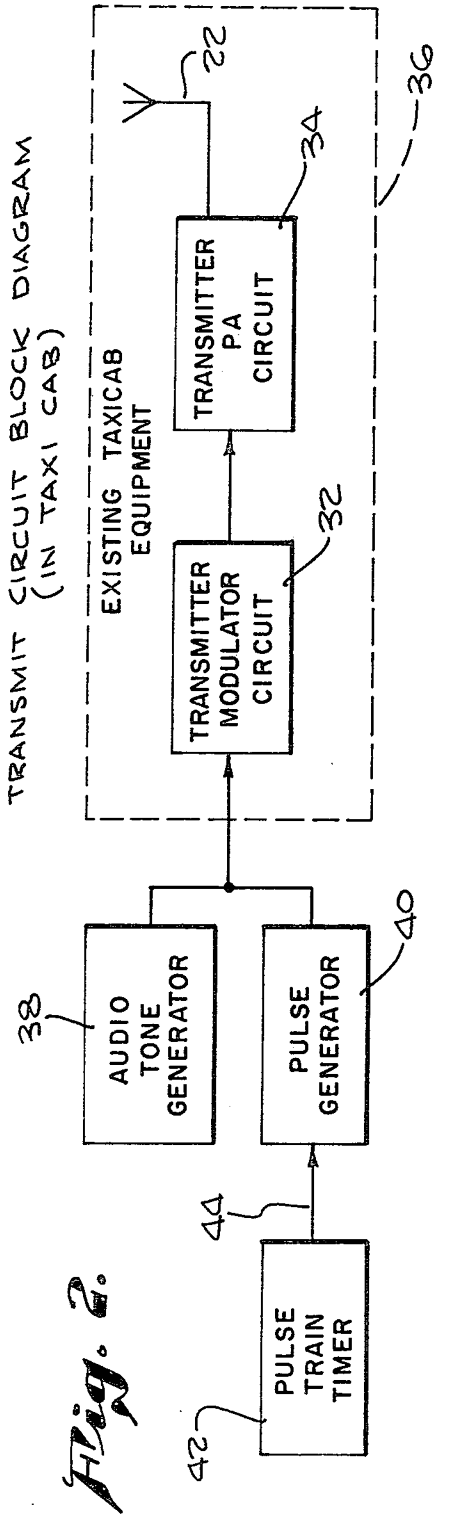
FIG. 2 is a block diagram of circuitry which may be included in the taxicab.

Referring more particularly to the drawings, FIG. 1 is a schematic showing of a system illustrating the principles of the invention, and it involves a central taxicab dispatcher's office 12 with the usual communication antenna 14 and two-way radio communication system 16. A large number of taxicabs, including the cab 18 carrying the serial number 52, are in constant radio communication with the central dispatch office 12, using a conventional mobile transmitter and receiver, or two-way radio 20, with certain special supplemental circuitry as will be disclosed hereinbelow. The antenna 22 for the taxi is shown mounted toward the rear of the cab. On the top of the taxicab is a dual illumination system including the normal taxi illumination emplacement 24 and a supplemental warning signal light designated 26 in FIG. 1. The supplemental warning signal 26 is carefully designed so that, while clearly visible from the outside of the taxicab, it does not shine directly onto the ground or have any brightly different illumination than that of the main advertising illumination sign 24, for reasons to be discussed below.

Now, assuming that the taxicab driver has picked up a passenger, and further that this passenger has threatened the driver and has requested, for example, that the driver turn over all his funds to the passenger, the driver of the taxicab then depresses the silent foot switch 28 which is located on the floor of the vehicle or on the sidewall of the vehicle adjacent the floor, where it can be easily reached by the driver, but where it is unlikely to be accidentally operated. Once the silent foot switch 28 has been actuated, it has a double pole, double throw action and will stay in the energized position until it is reset. It serves to initiate two actions, the first being to turn on the warning light 26 on the roof of the taxicab, and the second being to transmit a special coded and modulated signal over the transmitter of the two-way radio equipment 20 to alert the dispatch office that an attempted robbery is in progress. As disclosed in greater detail below, the signal which is transmitted back to the dispatch office will indicate the serial number (52) of the taxicab 18 and will then send a unique continous signal which may be with direction-finding equipment, so that the location of the taxicab 52 may be quickly ascertained by a mobile unit cooperating with the police.

Figure 3:
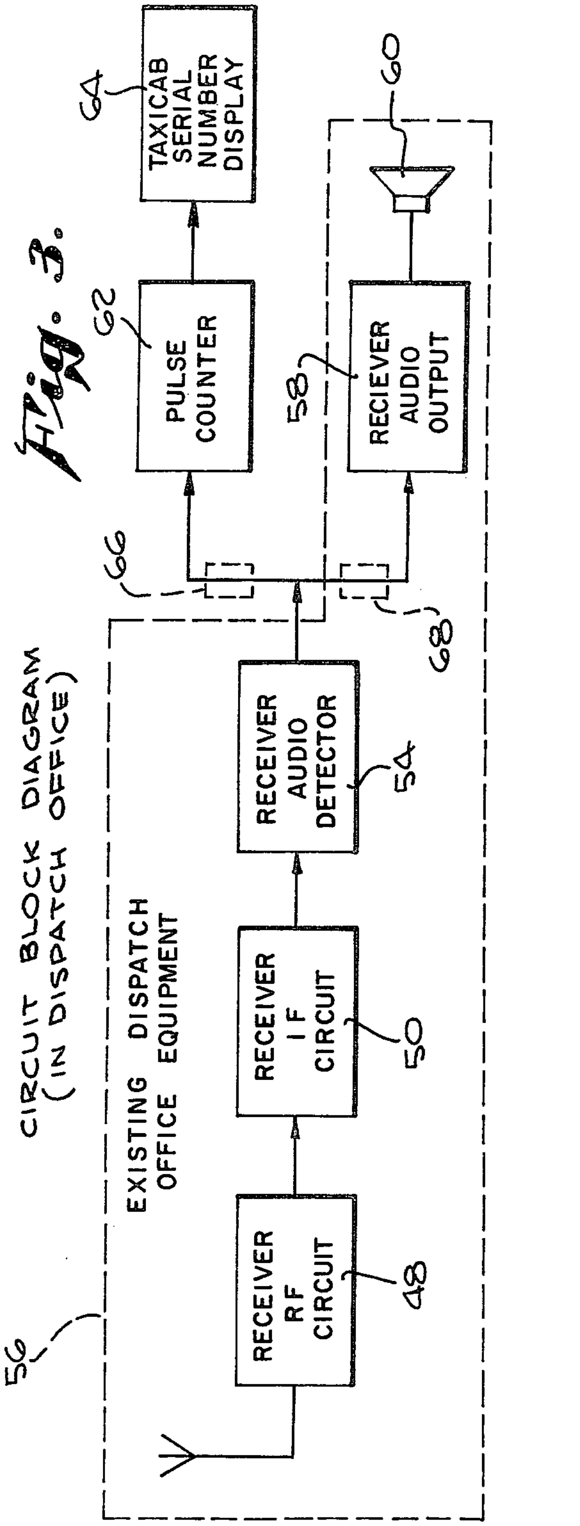
FIG. 3 is a block circuit diagram of equipment at the taxi dispatch office.

FIGS. 2 and 3 are block circuit diagrams showing equipment to be employed in connection with the taxicab, and the dispatcher's office, respectively. The dashed line blocks in both FIG. 2 and in FIG. 3 show the existing equipment in virtually all taxicabs and dispatcher's offices which are equipped with two-way radios.

Referring more specifically to FIG. 2, the existing radio equipment in the taxicab would normally include a transmitter modulator circuit 32 and a transmitter power amplification circuit 34 supplying radio frequency signals to the antenna 22. These equipments are shown enclosed within the dashed line block 36 which represents the "existing" taxicab equipment in most fleets. Coupled to the modulator circuit 32 are the audio tone generator circuit 38 and the pulse generator circuit 40. In addition, controlling the length of the pulse train which is produced by the pulse generator circuit 40 is a pulse train timer circuit 42. In the particular implementation described herein, the code which is sent back to the dispatcher's office includes a series of pulses provided by the pulse generator 40 which are equal in number to the serial number (52) of the taxicab. The number of pulses provided by the pulse generator circuit 40 is determined by the pulse train timer 42 which includes adjustable parameters which, after a predetermined period of time, provide a control signal on the lead 44 to disable pulse generator 40. Of course, each pulse train timer is differently adjusted to correspond with the serial number of the taxicab in which it is located.

FIG. 3 shows that the normally existing circuitry in the taxicab dispatch office includes the receiver RF circuitry 48, the receiver intermediate frequency amplification circuitry 50 and the receiver audio detector 54, all shown within the dashed lines 56, together with conventional audio output circuitry 58 and speaker 60. New equipment at the dispatch office includes a pulse counter 62 and a serial number display 64 which will provide an exact indication of the serial number of the cab at which the robbery may be in progress. In place of the pulse counter 62 and the pulse generator 40, other circuitry may be provided for generating and decoding more complex indications of the serial number of the taxicab. Following completion of the transmission of the coded signal indicating the taxicab serial number, the audio tone generator 38 will continue to be coupled to the modulator, and will continue to transmit a tone signal, such as 800 cycles per second, to the dispatch office.

If desired, additional filtering and/or detection circuitry 66 and 68 may be provided. The circuit 66 may be a band pass filter for the audio tone which is generated by circuit 38, and may also include a detector to supply pulses to the counter 62. Similarly, the filter 68 may be a band exclusion filter which will block a narrow band of audio frequencies centered at that of the tone generator 38. In practice, a working model which did not use the filter circuits 66 and 68 has been satisfactorily tested.

Figure 4:
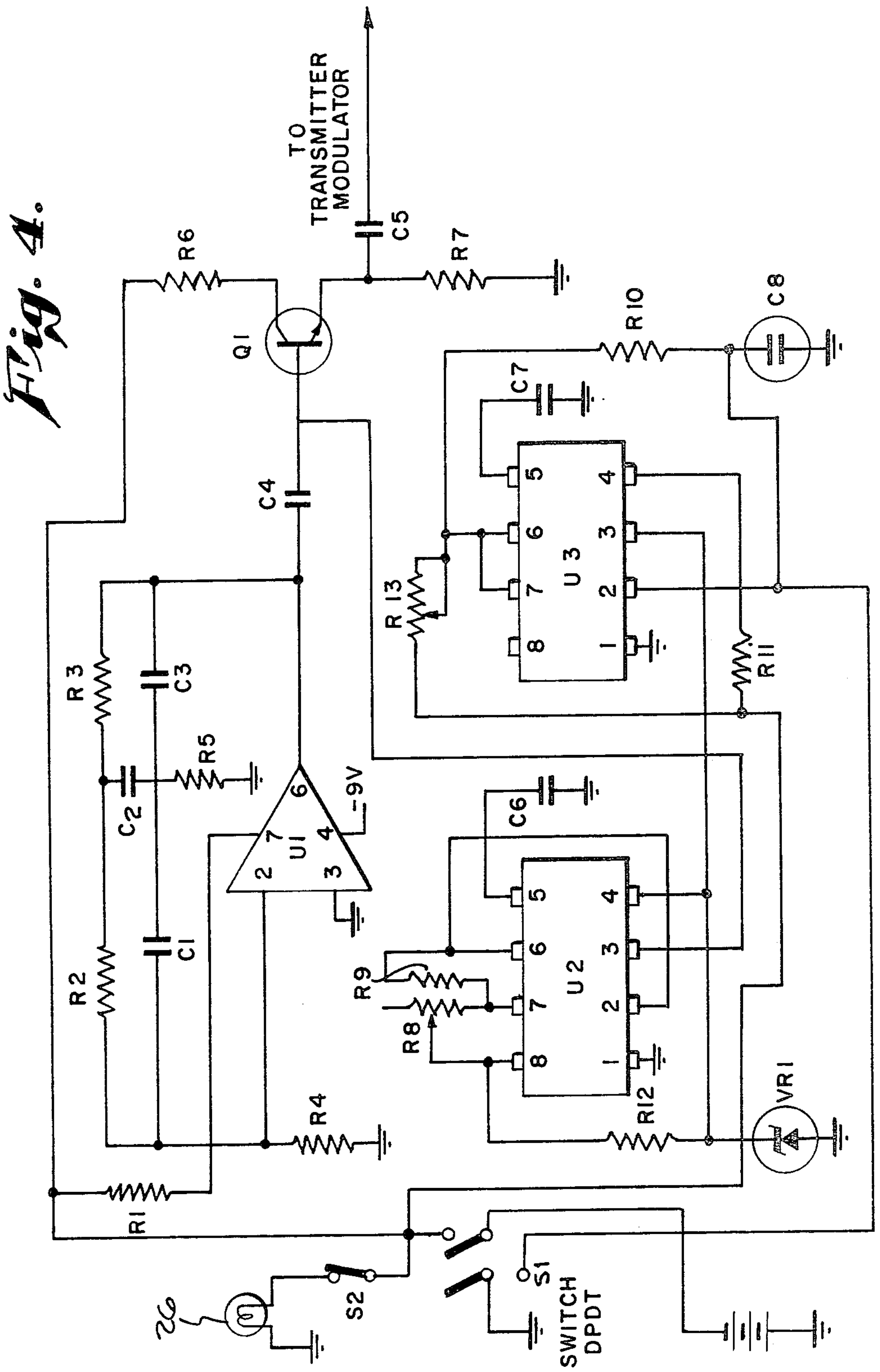
FIG. 4. is a circuit diagram of circuitry which may be employed to implement a portion of the circuit of FIG. 2.

The circuits of FIGS. 4 and 5 will now be reviewed in a very cursory manner, as they represent one implementation of the present invention. In FIG. 4, the operational amplifier U-1 forms part of the tone generation circuitry; the pulse generator circuitry is associated with the chip U-2, and the pulse generator cutoff circuit is implemented by the chip U-3.

The first switch S-1 is employed to turn on the lamp 26 and to energize the pulse generator circuitry. The switch S-1 is a double throw, double pole, push-on, push-off switch, and may for example be purchased from Allied under their Part No. 757-0740, manufacturer's Part No. SA42-SEW1. Switch at test-2 may be a similar silent switch and, as mentioned above, permits the driver to extinguish the warning lamp, in the event that the robber wants to step outside of the cab to see if it is turned on.

For completeness, the remainder of the parts employed in the illustrative circuit of FIG. 4 are listed below:

R1—10 ohms
R2—47,000 ohms
R3—47,000 ohms
R4—10,000 ohms
R5—3,900 ohms
R6—27 ohms
R7—4,700 ohms
R8—100,000 ohm, ¼ watt potentiometer—adjusts pulse repetition rate
R9—27,000 ohms
R10—27,000 ohms
R11—33,000 ohms
R12—560 ohms
R13—2 megohms—adjust pulse modulation time
C1—0.005 microfarad
C2—0.005 microfarad
C3—0.005 microfarad
C4—0.1 microfarad
C5—0.05 microfarad
C6—0.05 microfarad
C7—0.05 microfarad
C8—1.5 microfarad adjust pulse modulation time
S1—SA42SEW1 switch DPDT silent
S2—switch SPDT silent
Q1—2N2907
U1—uA741TC
U2—uA555TC
U3—uA555TC
VR1—IN756A Zener diode 8.2

FIG. 5 shows the implementation of the blocks 62 and 64 of FIG. 3. More specifically, with reference to FIG. 5, the three chips U1, U2 and U3 are decade counters, the three chips U4, U5 and U6 are seven segment decoders, and the three chips U7, U8 and U9 are light-emitting diodes or liquid crystal displays. When pulses are received on lead 72, the counters record the number of input pulses. The seven segment decoders receive the binary output from the decade counters, and give appropriate signals to the light-emitting diode displays to display a decimal number corresponding to the count stored in each of the decade counters. The reset switch 74 may be operated to reset the circuit of FIG. 5 so that new alert or warning signals may be received at the dispatch office.

The components included in FIG. 5 may be implemented as follows:

R1 through R21—330 ohms, ¼ Watt
R22—12 ohms, 5 Watts
U1—7090
U2—7090
U3—7090
U4—7447
U5—7447
U6—7447
U7—LED
U8—LED
U9—LED
S1—SPST, Momentary On It may be noted in passing that some of the components in FIG. 5 have the same designations as those of FIG. 4; however, the descriptive material associated with each of these figures is separate, so there should be no confusion.

In summary, a new protective system is provided for taxicab drivers which should significantly reduce the incidence of robberies. Advantages of the system include the silent nature of the foot switch, and the fact that both the local illumination warning and the radio signal are accomplished without the need for any awareness by the robber. Further, the silent radio signal transmitted to the dispatch office not only provides an identification of the serial number of the taxicab in which the robbery may be in progress, but also provides a continuous output signal which may be employed for radio direction-finding equipment to precisely locate the cab.

In the foregoing detailed description, one illustrative embodiment of the invention has been described. It is to be understood that other arrangements may be provided for accomplishing much the same results. Thus, by way of example but not of limitation, alternative warning illumination means may be provided external to the taxicab so that they may not be visible to the robber; different coded signals may be transmitted to the dispatch office, and alternative electronic circuitry may be employed in the implementation of the circuits. Accordingly, the present invention is not limited precisely to the embodiments and circuits as described in detail hereinabove.

What is claimed is:

1. A taxicab robbery dual long-range robbery alerting and local identification system comprising:

warning lamp means for mounting on said taxicab for giving a warning signal which is not visible from within the taxicab;

means mounted in said taxicab for transmitting a radio signal providing a unique digital representation of the identity of the taxicab and for providing a continuous unique alert signal;

silent foot operable switch means mounted in the taxicab for the energization of both said warning signal and also for initiating the operation of said radio signals by the taxicab driver;

means for maintaining said warning lamp and said radio signals operating until they are intentionally turned off; and means associated with a taxicab dispatch office for decoding said digital representation of the taxicab and for providing a display thereof;

whereby the taxicab dispatch personnel may alert the police as to the fact of a robbery in progress, the appearance of the taxicab and its approximate location, and positive local identification of the taxicab may be assured by the exterior warning lamp on the taxicab.

2. A system as defined in claim 1 wherein said radio transmission system in the taxicab includes common electronic equipment with the standard two-way radio transmission system employed by the taxicab.

3. A system as defined in claim 1 including means for mounting said warning lamp on the roof of the taxicab.

4. A system as defined in claim 1 wherein means are provided for transmitting said radio signals over the standard two-way radio systems employed in taxicabs.

5. A system as defined in claim 1 wherein means are provided for coupling said decoding and display means to the standard type of radio receiver employed in taxicab dispatch offices.

6. A system as defined in claim 1 further comprising additional silent foot operated switch means for selectively turning off said warning lamp after said lamp has been turned on without disabling the radio transmitting means.

7. A system as defined in claim 1 wherein said system includes means for transmitting a series of pulses equal in number to an identification number of said cab; and wherein said system includes pulse counting means associated with radio equipment at a taxicab dispatch office for counting the number of received pulses, whereby the cab identification number is displayed at the taxicab dispatch office.

8. A taxicab robbery dual long range robbery alerting and local identification system comprising:

warning lamp means for mounting on said taxicab for giving a warning signal which is not visible from within the taxicab;

means for transmitting a radio signal to provide a unique alert signal;

silent foot operable switch means mounted in the taxicab for the energization of said warning signal and for initiating the operation of said radio signals by the taxicab driver; and radio means for receiving said unique alert signal, whereby assistance may be sent to the taxicab where the robbery is in progress;

whereby the personnel manning the receiver may alert police vehicle personnel as to the fact of a robbery in progress and the appearance of the taxicab and its approximate location, and positive local identification of the taxicab may be assured by the exterior warning lamp on the taxicab.

9. A system as defined in claim 8 including means for mounting said warning lamp on the roof of the taxicab.

10. A system as defined in claim 8 wherein means are provided for transmitting said radio signals over the standard two-way radio systems employed in taxicabs.

* * * * *